US012632293B2

(12) United States Patent
Ballard et al.

(10) Patent No.: US 12,632,293 B2
(45) Date of Patent: May 19, 2026

(54) ASYNCHRONOUS CLIENT TO CLIENT TASK MANAGEMENT

(71) Applicant: Dell Products L.P., Round Rock, TX (US)

(72) Inventors: Lee E. Ballard, Georgetown, TX (US); Deepaganesh Paulraj, Bangalore (IN); Michael Raineri, Westborough, MA (US)

(73) Assignee: Dell Products L.P., Round Rock, TX (US)

( * ) Notice: Subject to any disclaimer, the term of this patent is extended or adjusted under 35 U.S.C. 154(b) by 583 days.

(21) Appl. No.: 18/154,250

(22) Filed: Jan. 13, 2023

(65) Prior Publication Data

US 2024/0241748 A1     Jul. 18, 2024

(51) Int. Cl.
*G06F 9/48* (2006.01)
*G06F 21/62* (2013.01)

(52) U.S. Cl.
CPC ........ *G06F 9/4881* (2013.01); *G06F 21/6209* (2013.01)

(58) Field of Classification Search
CPC .... G06F 9/4881; G06F 21/6209; G06F 9/445; G06F 9/48; G06F 9/4806; G06F 9/54; G06F 9/3005
See application file for complete search history.

(56) References Cited

U.S. PATENT DOCUMENTS

| | | | |
|---|---|---|---|
| 11,170,111 B1 | 11/2021 | Gowda et al. | |
| 11,438,229 B2 | 9/2022 | Ballard et al. | |
| 2006/0212329 A1* | 9/2006 | Lucas | G06Q 10/06 |
| | | | 715/779 |
| 2015/0244708 A1 | 8/2015 | Ballard | |
| 2020/0401458 A1* | 12/2020 | Roy | G06F 9/4887 |
| 2022/0309371 A1* | 9/2022 | Singh | G06N 10/00 |
| 2022/0350765 A1 | 11/2022 | Ballard et al. | |

* cited by examiner

*Primary Examiner* — Thomas C Lee
(74) *Attorney, Agent, or Firm* — Larson Newman, LLP

(57) ABSTRACT

A system generates a task object and a task updater object upon receipt of a request from an out-of-band client to execute a task on a processing unit via an in-band client, receives a status update from the in-band client upon execution of the task on the processing unit, and maps the task updater object to the task object associated with the task. The system may also update a state of the task object based on the status update of the task updater object, and transmit the state of the task object to the out-of-band client.

20 Claims, 4 Drawing Sheets

Information Handling System

102 Processor

104 Processor

134 Video Display

120 Memory 110 122 106 Chipset 108 132

130 136 Graphics Interface

112

140 NVRAM
142 BIOS/ EFI

170 I/O Interface

192

150 Disk Controller

176 TPM

180 Network Interface 174 172 Add-On Resource

156 ODD

152

154 HDD

182

160 Disk Emulator

190 BMC

194

164 162 Solid State Drive

ASYNCHRONOUS CLIENT TO CLIENT TASK MANAGEMENT

FIELD OF THE DISCLOSURE

The present disclosure generally relates to information handling systems, and more particularly relates to client to client task management.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

A system generates a task object and a task updater object upon receipt of a request from an out-of-band client to execute a task on a processing unit via an in-band client, receives a status update from the in-band client upon execution of the task on the processing unit, and maps the task updater object to the task object associated with the task. The system may also update a state of the task object based on the status update of the task updater object, and transmit the state of the task object to the out-of-band client.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
FIG. 1 is a block diagram illustrating an information handling system according to an embodiment of the present disclosure.

FIG. 1 illustrates an embodiment of an information handling system 100 including processors 102 and 104, a chipset 110, a memory 120, a graphics adapter 130 connected to a video display 134, a non-volatile RAM (NV-RAM) 140 that includes a basic input and output system/ extensible firmware interface (BIOS/EFI) module 142, a disk controller 150, a hard disk drive (HDD) 154, an optical disk drive 156, a disk emulator 160 connected to a solid-state drive (SSD) 164, an input/output (I/O) interface 170 connected to an add-on resource 174 and a trusted platform module (TPM) 176, a network interface 180, and a baseboard management controller (BMC) 190. Processor 102 is connected to chipset 110 via processor interface 106, and processor 104 is connected to the chipset via processor interface 108. In a particular embodiment, processors 102 and 104 are connected together via a high-capacity coherent fabric, such as a HyperTransport link, a QuickPath Interconnect, or the like. Chipset 110 represents an integrated circuit or group of integrated circuits that manage the data flow between processors 102 and 104 and the other elements of information handling system 100. In a particular embodiment, chipset 110 represents a pair of integrated circuits, such as a northbridge component and a southbridge component. In another embodiment, some or all of the functions and features of chipset 110 are integrated with one or more of processors 102 and 104.

Memory 120 is connected to chipset 110 via a memory interface 122. An example of memory interface 122 includes a double data rate (DDR) memory channel and memory 120 represents one or more DDR dual in-line memory modules (DIMMs). In a particular embodiment, memory interface 122 represents two or more DDR channels. In another embodiment, one or more of processors 102 and 104 include a memory interface that provides a dedicated memory for the processors. A DDR channel and the connected DDR DIMMs can be in accordance with a particular DDR standard, such as a DDR3 standard, a DDR4 standard, a DDR5 standard, or the like.

Memory 120 may further represent various combinations of memory types, such as dynamic random access memory (DRAM) DIMMs, static random access memory (SRAM) DIMMs, non-volatile DIMMs (NV-DIMMs), storage class memory devices, read-only memory (ROM) devices, or the like. Graphics adapter 130 is connected to chipset 110 via a graphics interface 132 and provides a video display output 136 to a video display 134. An example of a graphics interface 132 includes a Peripheral Component Interconnect-Express (PCIe) interface and graphics adapter 130 can include a four-lane (×4) PCIe adapter, an eight-lane (×8)

PCIe adapter, a 16-lane (×16) PCIe adapter, or another configuration, as needed or desired. In a particular embodiment, graphics adapter 130 is provided down on a system printed circuit board (PCB). Video display output 136 can include a Digital Video Interface (DVI), a High-Definition Multimedia Interface (HDMI), a DisplayPort interface, or the like, and video display 134 can include a monitor, a smart television, an embedded display such as a laptop computer display, or the like.

NV-RAM 140, disk controller 150, and I/O interface 170 are connected to chipset 110 via an I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including a PCIe interface, an Industry Standard Architecture (ISA) interface, a Small Computer Serial Interface (SCSI) interface, an Inter-Integrated Circuit (I²C) interface, a System Packet Interface (SPI), a Universal Serial Bus (USB), another interface, or a combination thereof. NV-RAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits SSD 164 to be connected to information handling system 100 via an external interface 162. An example of external interface 162 includes a USB interface, an institute of electrical and electronics engineers (IEEE) 1394 (Firewire) interface, a proprietary interface, or a combination thereof. Alternatively, SSD 164 can be disposed within information handling system 100.

I/O interface 170 includes a peripheral interface 172 that connects the I/O interface to add-on resource 174, to TPM 176, and to network interface 180. Peripheral interface 172 can be the same type of interface as I/O channel 112 or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral interface 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a network communication device disposed within information handling system 100, on a main circuit board of the information handling system, integrated onto another component such as chipset 110, in another suitable location, or a combination thereof. Network interface 180 includes a network channel 182 that provides an interface to devices that are external to information handling system 100. In a particular embodiment, network channel 182 is of a different type than peripheral interface 172 and network interface 180 translates information from a format suitable to the peripheral channel to a format suitable to external devices.

In a particular embodiment, network interface 180 includes a NIC or host bus adapter (HBA), and an example of network channel 182 includes an InfiniBand channel, a Fibre Channel, a Gigabit Ethernet channel, a proprietary channel architecture, or a combination thereof. In another embodiment, network interface 180 includes a wireless communication interface, and network channel 182 includes a Wi-Fi channel, a near-field communication (NFC) channel, a Bluetooth® or Bluetooth-Low-Energy (BLE) channel, a cellular based interface such as a Global System for Mobile (GSM) interface, a Code-Division Multiple Access (CDMA) interface, a Universal Mobile Telecommunications System (UMTS) interface, a Long-Term Evolution (LTE) interface, or another cellular based interface, or a combination thereof. Network channel 182 can be connected to an external network resource (not illustrated). The network resource can include another information handling system, a data storage system, another network, a grid management system, another suitable resource, or a combination thereof.

BMC 190 is connected to multiple elements of information handling system 100 via one or more management interface 192 to provide out of band monitoring, maintenance, and control of the elements of the information handling system. As such, BMC 190 represents a processing device different from processor 102 and processor 104, which provides various management functions for information handling system 100. For example, BMC 190 may be responsible for power management, cooling management, and the like. The term BMC is often used in the context of server systems, while in a consumer-level device a BMC may be referred to as an embedded controller (EC). A BMC included at a data storage system can be referred to as a storage enclosure processor. A BMC included at a chassis of a blade server can be referred to as a chassis management controller and embedded controllers included at the blades of the blade server can be referred to as blade management controllers. Capabilities and functions provided by BMC 190 can vary considerably based on the type of information handling system. BMC 190 can operate in accordance with an Intelligent Platform Management Interface (IPMI). Examples of BMC 190 include an Integrated Dell® Remote Access Controller (iDRAC).

Management interface 192 represents one or more out-of-band communication interfaces between BMC 190 and the elements of information handling system 100, and can include an Inter-Integrated Circuit (I2C) bus, a System Management Bus (SMBUS), a Power Management Bus (PMBUS), a Low Pin Count (LPC) interface, a serial bus such as a Universal Serial Bus (USB) or a Serial Peripheral Interface (SPI), a network interface such as an Ethernet interface, a high-speed serial data link such as a PCIe interface, a Network Controller Sideband Interface (NC-SI), or the like. As used herein, out-of-band access refers to operations performed apart from a BIOS/operating system execution environment on information handling system 100, that is apart from the execution of code by processors 102 and 104 and procedures that are implemented on the information handling system in response to the executed code.

BMC 190 operates to monitor and maintain system firmware, such as code stored in BIOS/EFI module 142, option ROMs for graphics adapter 130, disk controller 150, add-on resource 174, network interface 180, or other elements of information handling system 100, as needed or desired. In particular, BMC 190 includes a network interface 194 that can be connected to a remote management system to receive firmware updates, as needed or desired. Here, BMC 190 receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image.

BMC 190 utilizes various protocols and application programming interfaces (APIs) to direct and control the processes for monitoring and maintaining the system firmware. An example of a protocol or API for monitoring and maintaining the system firmware includes a graphical user interface (GUI) associated with BMC 190, an interface defined by the Distributed Management Taskforce (DMTF) (such as a Web Services Management (WSMan) interface, a Management Component Transport Protocol (MCTP) or, a Redfish® interface), various vendor defined interfaces (such as a Dell EMC Remote Access Controller Administrator (RACADM) utility, a Dell EMC OpenManage Enterprise, a Dell EMC OpenManage Server Administrator (OMSS) utility, a Dell EMC OpenManage Storage Services (OMSS) utility, or a Dell EMC OpenManage Deployment Toolkit (DTK) suite), a BIOS setup utility such as invoked by a "F2" boot option, or another protocol or API, as needed or desired.

In a particular embodiment, BMC 190 is included on a main circuit board (such as a baseboard, a motherboard, or any combination thereof) of information handling system 100 or is integrated onto another element of the information handling system such as chipset 110, or another suitable element, as needed or desired. As such, BMC 190 can be part of an integrated circuit or a chipset within information handling system 100. An example of BMC 190 includes an iDRAC, or the like. BMC 190 may operate on a separate power plane from other resources in information handling system 100. Thus BMC 190 can communicate with the management system via network interface 194 while the resources of information handling system 100 are powered off. Here, information can be sent from the management system to BMC 190 and the information can be stored in a RAM or NV-RAM associated with the BMC. Information stored in the RAM may be lost after power-down of the power plane for BMC 190, while information stored in the NV-RAM may be saved through a power-down/power-up cycle of the power plane for the BMC.

Information handling system 100 can include additional components and additional busses, not shown for clarity. For example, information handling system 100 can include multiple processor cores, audio devices, and the like. While a particular arrangement of bus technologies and interconnections is illustrated for the purpose of example, one of skill will appreciate that the techniques disclosed herein are applicable to other system architectures. Information handling system 100 can include multiple central processing units (CPUs) and redundant bus controllers. One or more components can be integrated together. Information handling system 100 can include additional buses and bus protocols, for example, I²C and the like. Additional components of information handling system 100 can include one or more storage devices that can store machine-executable code, one or more communications ports for communicating with external devices, and various input and output (I/O) devices, such as a keyboard, a mouse, and a video display.

For purposes of this disclosure, information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smartphone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as processor 102, a programmable logic array (PLA), an embedded device such as a System-on-a-Chip (SoC), or other control logic hardware. Information handling system 100 can also include one or more computer-readable media for storing machine-executable code, such as software or data.

In one or more embodiments, BMC 190 may include a remote access controller that is based at least on one standard, such as an intelligent platform management interface (IPMI) or Redfish® standard. For instance, the remote access controller may allow and/or permit utilization of IPMI out-of-band interfaces such as IPMI over local area network (LAN). This may allow a user to remotely, via a client, send a request to the remote access controller to execute a task in one or more devices of the information handling system. In turn the remote access controller may send a request to execute the task to a client, such as a Redfish® client, in the processing unit. However, the processing unit client is typically not designed to send updates regarding the status of the task to the remote access controller. Accordingly the remote access controller may have to continually poll for status updates, which is inefficient. Further, the processing unit client typically utilizes proprietary methods, which are typically different than the proprietary methods that are generally implemented in the remote access controller because the processing unit and the remote access controller are typically manufactured by different companies. To address these and other concerns, the present disclosure provides a system and method for asynchronous communication between at least the processing unit clients and the out-of-band client utilized by the user in sending the request.

Figure 2:
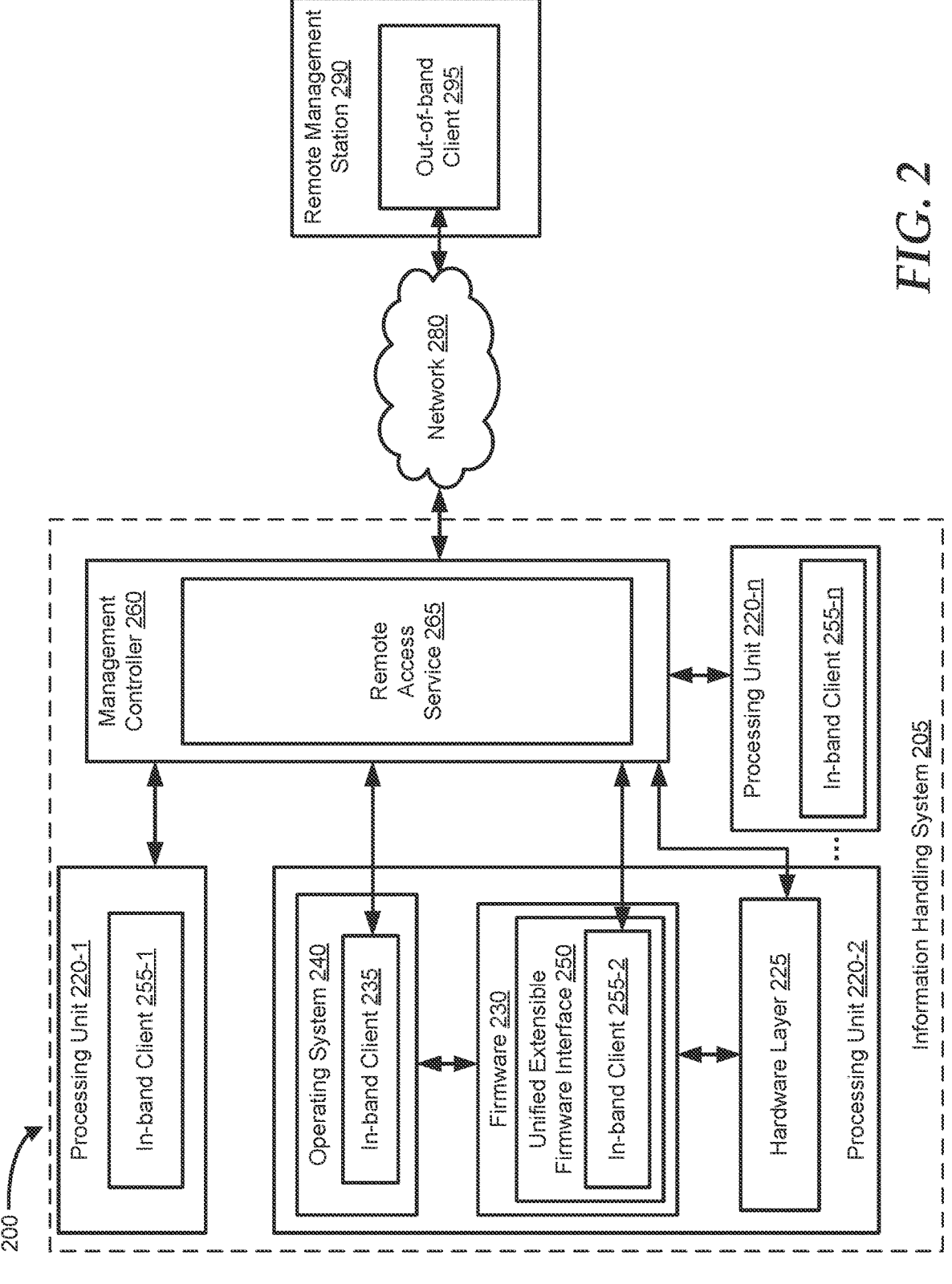
FIG. 2 is a block diagram illustrating a system for client to client task management, according to an embodiment of the present disclosure.

FIG. 2 shows a system 200 for client to client task management or orchestration via asynchronous communication between the clients. System 200 includes an information handling system 205, a network 280 and a remote management station 290. Information handling system 205, which is similar to information handling system 100 of FIG. 1, also includes processing units 220-1 through 220-*n* (collectively referred to as processing units 220), and a management controller 260. Each of processing units 220 includes an in-band client, such as in-band clients 255-1 through 255-*n* (collectively referred to herein as in-band clients 255). Processing unit 220-2 shows a more detailed configuration of processing units 220. In this example, processing unit 220-2 includes a hardware 225, a firmware 230, and an operating system 240. Operating system 240 includes in-band client 235. Firmware 230 includes a UEFI 250 that further includes an in-band client 255. Other processing units may have similar configuration.

Processing unit 220 may be a programmable specialized electronic circuit, such as a data processing unit, smart network interface card, infrastructure processing unit, smart graphics processing unit, field programmable gate arrays or similar. In-band clients 255 may be communicatively coupled to management controller 260 via one or more protocols like hypertext transfer protocol (HTTP) or similar. Hardware layer 225 may be communicatively coupled to management controller 260 via a sideband access using at least protocol such as I²C, reduced media independent interface (RMII) based transport (RBT), PCIe, management component transport protocol, etc.

In-band clients may be configured to automate and streamline systems management tasks independently or by communicating with a management controller 260 or similar. In-band clients 235 and 255 may communicate with management controller 260 using one or more protocols, such as HTTP. For example, in-band clients 235 and 255 may understand the Redfish® standard that uses the representational state transfer (REST) architecture interface. Although, exemplary embodiments are applicable to any protocol or service. Management controller 260, or in particular remote access controller 265, may utilize both an in-band and sideband communications with the various components of information handling system 205.

Management controller 260, which is similar to BMC 190 of FIG. 1, is a separate processing unit such as a SoC, for managing various features of information handling system 205. Management controller 260 may include any system, device, or apparatus configured to facilitate management and/or control of components of information handling system 205. For example, management controller 260 may include a microprocessor, microcontroller, a digital signal processor, an application-specific integrated circuit (ASIC), field-programmable gate array (FPGA), electrically erasable programmable read-only memory, or any combination thereof. In certain embodiments, management controller 260 may include or may be an integral part of a chassis management controller, a BMC, a DRAC, an iDRAC, an enclosure controller, a service processor, or an embedded controller. In these and other embodiments, management controller 260 may also be referred to as an access controller or a life-cycle controller.

Management controller 260 may be configured to provide out-of-band management facilities, via remote access controller 265 for management of various components of information handling system 205. Such management may be made by management controller 260 even if information handling system 205 is powered off or powered to a standby state. In one embodiment, management controller 260 may be communicatively coupled to operating system kernel such as via a network interface card. The network interface card may enable management controller 260 to communicate over a network using any suitable transmission protocol and/or standard, such as via HTTP to manage information handling system 200. For example, management controller 260 may communicate with in-band client 235, 255, via HTPP.

Remote management station 240 may include a management console for a user or administrator to access management controller 260, or remote access controller 265 in particular, via network 235. Network 235 may include a LAN, a wide area network, an Internet, and/or other network or network combinations while remaining within the scope of the present disclosure. For example, remote management station 240 may provide a user an interface to interact with management controller 260 and configure control and management of the resources of information handling system 100. As another example, management controller 260 may implement a management protocol, such as Redfish® or WSMan, permitting the user to remotely access management controller 260 via remote management controller station 240 to configure information handling system 100 and its resources.

During management of said resources, management controller 260 may be receiving a request to perform a task on one or more resources of information handling system 205. For example, the user may request a firmware update for firmware 230. In another example, the user may also request a BIOS update for UEFI 250 or an operating system update for operating system 240. For example, if out-of-band client 295 requests a task, management controller 260 may send an event to in-band client 255 if the system is in a state that in-band client 255 can receive the event. Upon receipt of the request, management controller 260 may generate a task object and an associated task updater object under a system object associated with a target. The target may be a processing unit, UEFI, operating system, etc. in which the task would be performed.

In one embodiment, the properties of the task updater object may mirror the properties or attributes of the task object. For example, similar to the task object, the task updater object may have the following properties: capabilities, task state, start time, end time, task status, messages, etc. The task updater object may also have a property that management controller 260 can use to hold the last task event or status of the task, such as added, updated, removed, or similar. For example, if the task was deleted then a task event attribute in the task updater object would be set to "removed" and a change event would be sent to in-band client 255.

The in-band client may have read and/or write permissions to the properties of the task updater object. The task updater object may be bound to the target and only visible to the in-band client associated with the task object. For example, in-band client 274 does not have visibility to a task updater object associated with a task running at processing 220 and vice versa. This allows for implementation various security options such as a least privilege security option. In another embodiment, the task updater object may have security different permission and/or ownership properties than the task object. Accordingly, credentials used by out-of-band client 295 to talk to management controller 260 may be different than the credentials used by in-band client 255 to talk to management controller 260.

Subsequent to generating the task object and the task updater object, management controller 260 may then communicate with the associated in-band client of the target to initiate the task. For example, if the in-band client starts running instructions associated with the task, the in-band client may update the task status of the task updater object. When the in-band client updates one or more properties of the task updater object, management controller 260 may detect the update and determine the associated task object. Management controller 260 may then update a corresponding property in the task object.

The execution of task may cause in-band client 255 to exit and go offline and then get back online, such as during a reboot. For example, processing unit 220 may implement a secure erase as an UEFI script which may reboot processing unit 220. In another example, user may execute a task to boot information handling system 205 to an erase utility to restore an operating system image. To avoid the loss of the status of the task when in-band client 255 goes offline, a property of the task updater object can be used as an internal storage by in-band client 255 to save information before it goes offline or gives control to another executable. After in-band client 255 comes back online, it can retrieve the stored information and proceed with the execution of the task.

Although information handling system 205 is depicted herein to include a plurality of processing units, information handling system 205 may include only one processing unit similar to processing unit 220 or none. In addition, although the client to client task management depicted herein is between an out-of-band client and an in-band client in a processing unit, similar client to client task management may be performed without limitation between the out-of-band client and an in-band client included in other components of the information handling system, such as in the host operating system or the host BIOS/UEFI.

Those of ordinary skill in the art will appreciate that the configuration, hardware and/or software components of system 200 depicted in FIG. 2 may vary. For example, the illustrative components of system 200 are not intended to be exhaustive, but rather are representative to highlight components that can be utilized to implement aspects of the present disclosure. For example, other devices and/or components may be used in addition to or in place of the devices/components depicted. The depicted example does not convey or imply any architectural or other limitations with respect to the presently described embodiments and/or the general disclosure. In the discussion of the figures, reference may also be made to components illustrated in other figures for continuity of the description.

Figure 3:
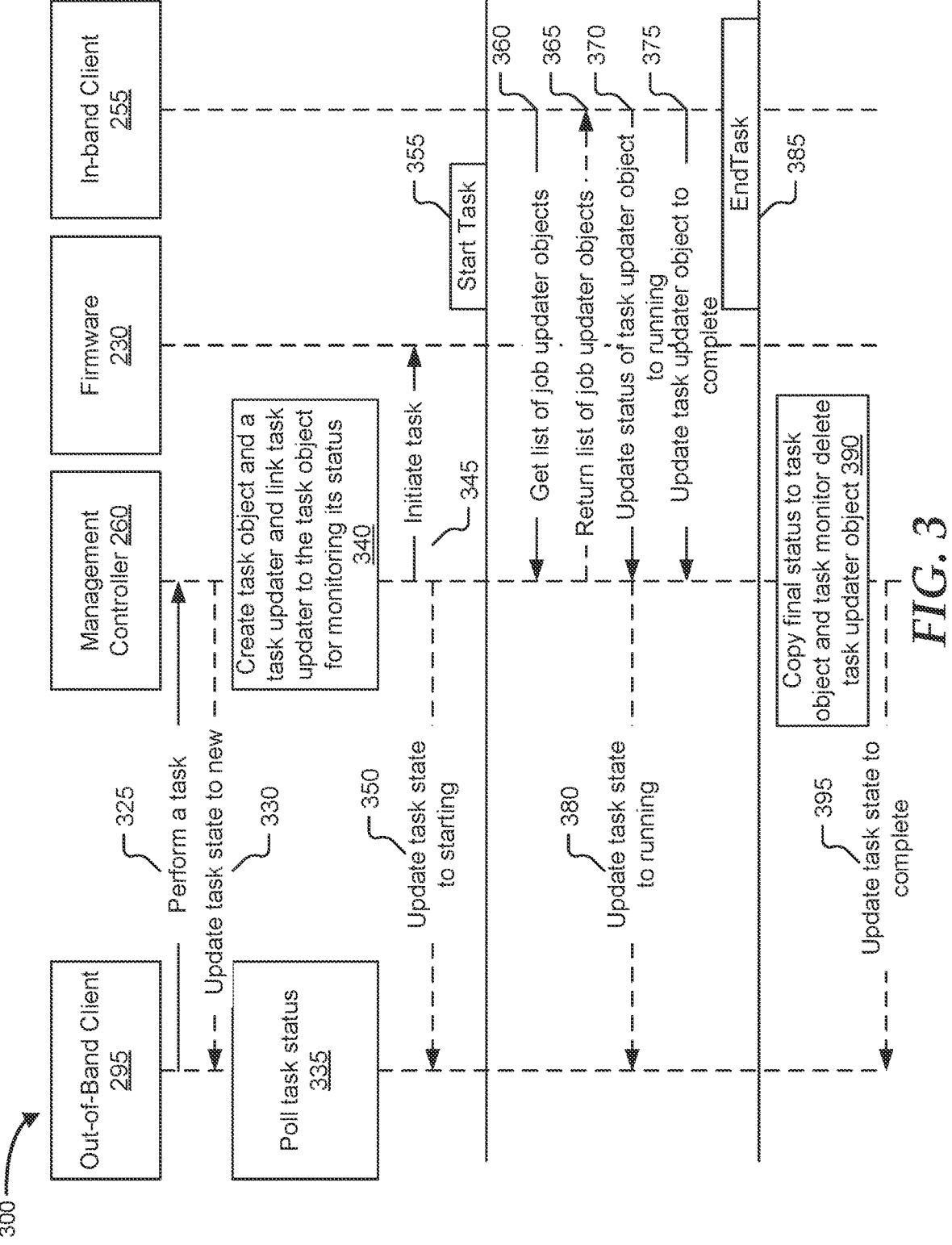
FIG. 3 is a flowchart illustrating a method for client to client task management, according to an embodiment of the present disclosure.

FIG. 3 shows a flow chart of a method 300 for client to client task management or orchestration. In particular, method 300 illustrates asynchronous task communication between an out-of-band client and an in-band client through a management controller. The asynchronous task communication may be performed via various standards, such as the Redfish® standard. Method 300 may be performed by one or more components, such as out-of-band client 295, management controller 260, firmware 230, and in-band client 255. However, while embodiments of the present disclosure are described in terms of system management system 205 of FIG. 2, it should be recognized that other systems may be utilized to perform the described method. One of skill in the art will appreciate that this flowchart explains a typical example, which can be extended to advanced applications or services in practice. In addition, although the example method shows in-band client 255, in-band client 235 may also be configured to perform operations and/or tasks of in-band client 255 without limitation.

Method 300 typically starts at operation 325, where a user at a remote management station 290 with out-of-band client 295 may transmit a request to perform a task. For example, a user may perform a lifecycle management command such as a secure erase of processing unit 220, secure boot, etc. At operation 330, management controller 260 may transmit a response to out-of-band client 295. The response may include a status of 202 indicating that a new task has been accepted for processing. At operation 335, out-of-band client 295 may start polling the status of the task requested at operation 332. For example, out-of-band client 295 may generate and use a task monitor object to poll the status.

At operation 340, management controller 260 may generate a task object and a task updater object. The task updater object, which may be linked to the task object, is typically used to update the status of the task object. The task object may also be linked to the task monitor object, which may be used to update out-of-band client 295. At operation 345, management controller 260 may initiate a process associated with the task. At this point the processing unit and/or information handling system may reboot depending on the task performed. As such, some operations may be performed starting from the boot process. Accordingly, block 355 identifies the start of the task while block 385 identifies the end of the task, wherein operations 360, 365, 370, and 375 are performed in between. However, one of skill in the art will appreciate that there can be more or less operations performed between blocks 355 and 375 that are all part of the task. In addition, other types of operations may be performed instead of operations 360, 365, 370, and 375.

At operation 350, which may occur prior to the reboot, management controller 260 may transmit a response to out-of-band client 295. The response may include the current status of the task. For example, the response may include a task status, wherein the current state of the task is starting. The task status may be based on the current status of the task object, which in turn may be based on the current status of the task updater object, which have been updated when the task was initiated at operation 345.

At operation 360, in-band client 255 may transmit a request for a list of task updater objects or a list of tasks to management controller 260. This may be used by in-band client 255 to determine the next operations associated with the task. At operation 365, management controller 260 may transmit a response to in-band client 255, wherein the response include the list of task updater objects or a list of tasks associated with the task and/or target, wherein the target is associated with in-band client 255. The list of task updater objects may be based on one or more credentials of in-band client 255. As operations associated with the task are being performed, in-band client 255 may periodically send status updates. In-band client 255 may send a task status update to management controller 260 while the task is running. For example, at operation 370, in-band client 255 may transmit an update of the task status to management controller 260. Upon receipt of the update, management controller 260 may transmit a status update to out-of-band client 295, at operation 380. When the task is complete, in-band client may transmit the task status to management controller 260. For example, at operation 375, in-band client 255 may transmit a status complete to management controller 260 when the task is finished and update task status of task updater object.

At operation 390, management controller 260 may copy a final status, such as when the task is complete, to the task object and/or the task monitor object. Management controller 260 may also delete the task updater object. At operation 395, management controller 260 may transmit an update on the completion of the task to out-of-band client 295.

In this embodiment, method 300 generates a separate task updater object which may be used to mirror the task object and/or the task monitor object. In another embodiment, in-band client 255, which may be a Redfish® client, may be granted "super" privileges to update read-only attributes of the task object and the task monitor object. This means that in-band client 255 may need a persistent memory for the task to keep its own copy of the task properties and/or status to support the task, such as to remove and update task operations.

The devices and/or components in method 300 may packetize communications or messages into packets of data according to a packet protocol, such as the internet protocol. The packets of data contain bits or bytes of data describing the contents, or payload, of a message. A header of each packet of data may contain routing information identifying an origination address and/or destination address. The header may also identify the protocol used, such as Redfish® or similar. Accordingly, the header may be used to identify whether the client is a Redfish® service endpoint.

Figure 4:
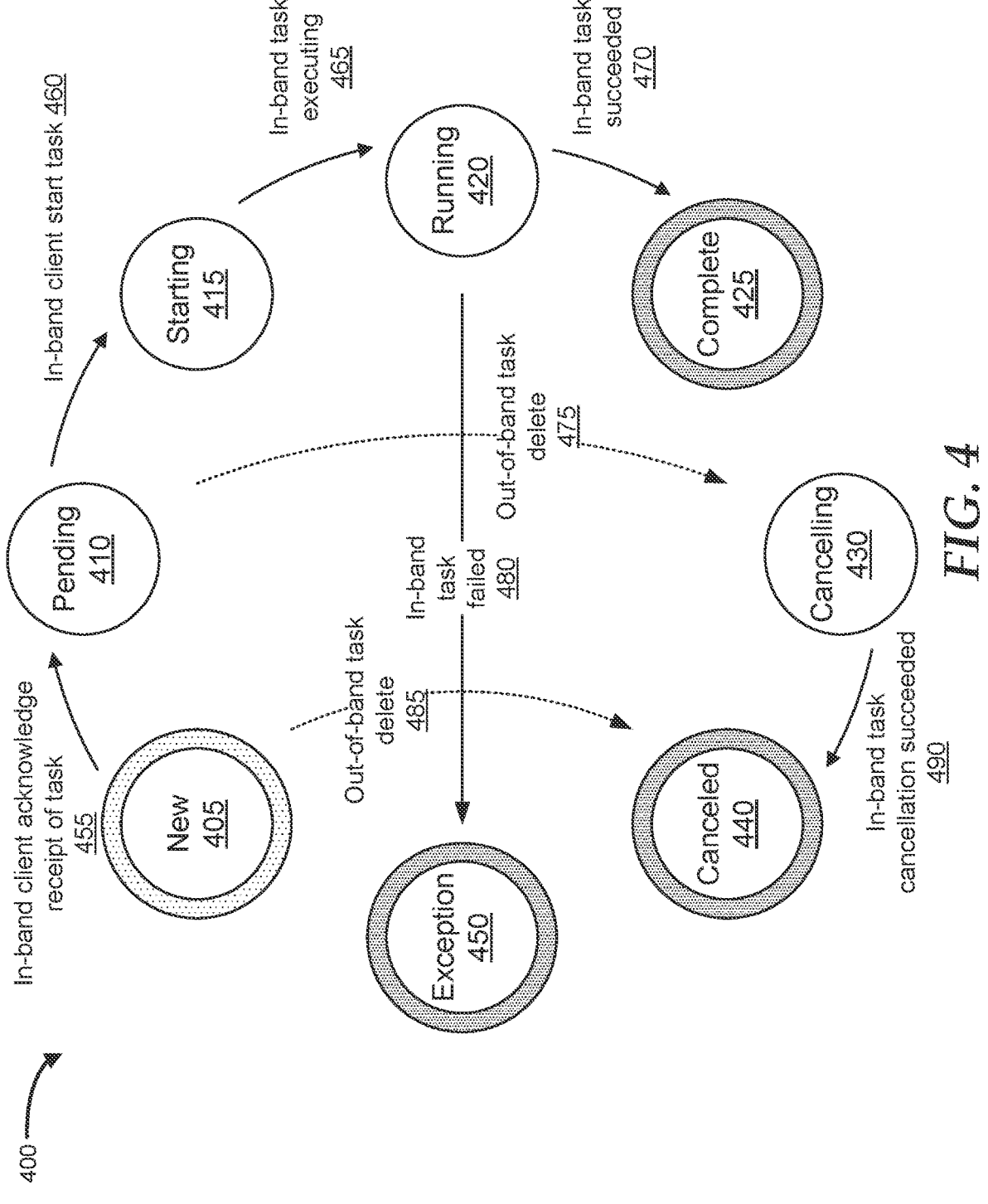
FIG. 4 is a diagram illustrating of a state transition graph of a task updater object, according to an embodiment of the present disclosure.

FIG. 4 shows exemplary state diagram 400 of an in-band task updater object. In general, the various states of the task updater object may be mirrored by management controller to the task object and task monitor object, wherein the task updater objects may only be part of the out-of-band task from the out-of-band client. For example, an out-of-band task such as out-of-band processing unit firmware update may include rebooting the information handling system to reboot the processing unit and validate that the task to update the firmware is complete. In this case the out-of-band task would start before and end after the in-band task updater object.

Task updater object typically starts at a new state 405 when a request to perform a task is received by the in-band client from an out-of-band client. The state of the task updater object may transition from new state 405 to a cancelled state 440 when an out-of-band request to delete the task is received at a state transition 485. The state of the task updater object may transition to a pending state 410 from new state 405 when the in-band client acknowledges receipt of the task at a state transition 455. For example, in-band client may transmit an "ACK" to the management controller.

The state of the task updater object may transition to a starting state 415 when the in-band client starts the task at a state transition 460 and then to a running state 420 when in-band client is executing the task at a state transition 465. When the execution of the task is successful at a state transition 470, the task updater object may transition from running state 420 to a complete state 425, which is an end state. However, when the execution of the task failed at a state transition 480, then the state of the task updater object may transition from running state 420 to an exception state 450, which is an end state.

The state of the task updater object may transition from pending state 410 to a cancelling state 430 when an out-of-band task delete request is received at a state transition 475. However, the state of the task updater object may transition to a cancelled state 440, which is an end state, when the in-band task cancellation succeeds at a state transition 490.

As used herein, a hyphenated form of a reference numeral refers to a specific instance of an element and the un-hyphenated form of the reference numeral refers to the collective or generic element. Thus, for example, processing unit "220-1" refers to an instance of a processing unit, which may be referred to collectively as processing units "220" and any one of which may be referred to generically as processing unit "220." Similarly, in-band client "255-1" refers to an instance of an in-band client, which may be referred to collectively as in-band clients "255" and any one of which may be referred to generically as in-band client "255."

Although FIG. 3 shows example operations of method 300 400 in some implementation, method 300 may include additional operations, fewer operations, different operations, or differently arranged operations than those depicted in FIG. 3. Those skilled in the art will understand that the principles presented herein may be implemented in any suitably arranged processing system. Additionally, or alternatively, two or more of the operations of method 300 may be performed in parallel. For example, operations 335 and 340 may be performed in parallel.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

When referred to as a "device," a "module," a "unit," a "controller," or the like, the embodiments described herein can be configured as hardware. For example, a portion of an information handling system device may be hardware such as, for example, an integrated circuit (such as an ASIC, a FPGA, a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The present disclosure contemplates a computer-readable medium that includes instructions or receives and executes instructions responsive to a propagated signal; so that a device connected to a network can communicate voice, video or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or another storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents but also equivalent structures.

What is claimed is:

1. A method comprising:

generating, by a baseboard management controller, a task object and a task updater object upon receipt of a request from an out-of-band client to execute a task on a processing unit via an in-band client;

linking the task updater object to the task object associated with the task associated with the request from the out-of-band client;

subsequent to initiating the task on the processing unit associated with the in-band client, receiving a status update from the in-band client upon execution of the task on the processing unit, wherein the status update is based on the in-band client updating the task updater object;

linking a task monitor object to the task object, wherein the task monitor object is used for updating the out-of-band client;

updating a state of the task object based on the status update of the task updater object;

updating the task monitor object of the state of the task object; and transmitting the state of the task monitor object associated with the out-of-band client to the out-of-band client.

2. The method of claim 1, wherein the status update is stored in the task updater object.

3. The method of claim 1, wherein the task updater object is associated with the processing unit.

4. The method of claim 1, wherein the task updater object is visible to the in-band client.

5. The method of claim 1, wherein the in-band client is associated with the processing unit on which the task is executed.

6. The method of claim 1, wherein the in-band client has a write permission to the task updater object.

7. The method of claim 1, wherein the in-band client has a read permission to the task updater object.

8. The method of claim 1, wherein the task updater object includes a first set of properties that mirrors a second set of properties of the task object.

9. The method of claim 1, further comprising transmitting a list of tasks based on a credential of the in-band client.

10. The method of claim 9, wherein the list of tasks is for the processing unit on which the in-band client is associated.

11. An information handling system, comprising:

a processor; and a memory storing instructions that when executed cause the processor to perform operations including:

generating a task object and a task updater object upon receipt of a request from an out-of-band client to execute a task on a processing unit via an in-band client;

linking the task updater object to the task object associated with the task associated with the request from the out-of-band client;

subsequent to initiating the task on the processing unit associated with the in-band client, receiving a status update from the in-band client upon execution of the task on the processing unit, wherein the status update is based on the in-band client updating the task updater object;

linking a task monitor object to the task object, wherein the task monitor object is used for updating the out-of-band client;

updating a state of the task object based on the status update of the task updater object;

updating the task monitor object of the state of the task object; and transmitting the state of the task monitor associated with the out-of-band client to the out-of-band client.

12. The information handling system of claim 11, wherein the task updater object is associated with the processing unit.

13. The information handling system of claim 11, wherein the task updater object is visible to the in-band client.

14. The information handling system of claim 11, wherein the in-band client is associated with the processing unit.

15. The information handling system of claim 11, wherein the in-band client has a write permission to the task updater object.

16. A non-transitory computer-readable medium to store instructions that are executable to perform operations comprising:

generating a task object and a task updater object upon receipt of a request from an out-of-band client to execute a task on a processing unit via an in-band client;

linking the task updater object to the task object associated with the task associated with the request from the out-of-band client;

subsequent to initiating the task on the processing unit associated with the in-band client, receiving a status update from the in-band client upon execution of the task on the processing unit, wherein the status update is based on the in-band client updating the task updater object;

linking a task monitor object to the task object, wherein the task monitor object is used for updating the out-of-band client;

updating a state of the task object based on the status update stored in the task updater object;

updating the task monitor object of the state of the task object; and transmitting the state of the task monitor object associated with the out-of-band client to the out-of-band client.

17. The non-transitory computer-readable medium of claim 16, wherein the task updater object is associated with the processing unit.

18. The non-transitory computer-readable medium of 16, wherein the task updater object is visible to the in-band client.

19. The non-transitory computer-readable medium of claim 16, wherein the in-band client has a write permission to the task updater object.

20. The non-transitory computer-readable medium of claim 16, wherein the in-band client has a read permission to the task updater object.

* * * * *